United States Patent
Slator et al.

[15] 3,651,906
[45] Mar. 28, 1972

[54] AUTOMATIC MECHANICAL CLUTCH

[72] Inventors: Damon T. Slator; Archie R. Wilson, both of Houston, Tex.

[73] Assignee: Bowen Tools, Inc.

[22] Filed: Apr. 2, 1970

[21] Appl. No.: 25,216

[52] U.S. Cl. .................................192/35, 192/93 A, 188/83
[51] Int. Cl. ..........................................................F16d 43/00
[58] Field of Search.............................192/35, 36, 93 A, 44

[56] References Cited

UNITED STATES PATENTS

| | | | |
|---|---|---|---|
| 1,597,198 | 8/1926 | Howell | 192/108 |
| 3,194,367 | 7/1965 | Winter | 192/16 |
| 3,404,763 | 10/1968 | Reed | 192/103 C |
| 3,034,619 | 5/1962 | Glasgow et al. | 192/7 |
| 3,217,847 | 11/1965 | Petrak | 192/93 A |

Primary Examiner—Benjamin W. Wyche
Assistant Examiner—Randall Heald
Attorney—Pravel, Wilson & Matthews

[57] ABSTRACT

A new and improved automatic mechanical clutch adapted to releasably interconnect two shafts upon a rotation of one of the shafts, and to disconnect such shafts when the rotation of such shaft is discontinued.

7 Claims, 4 Drawing Figures

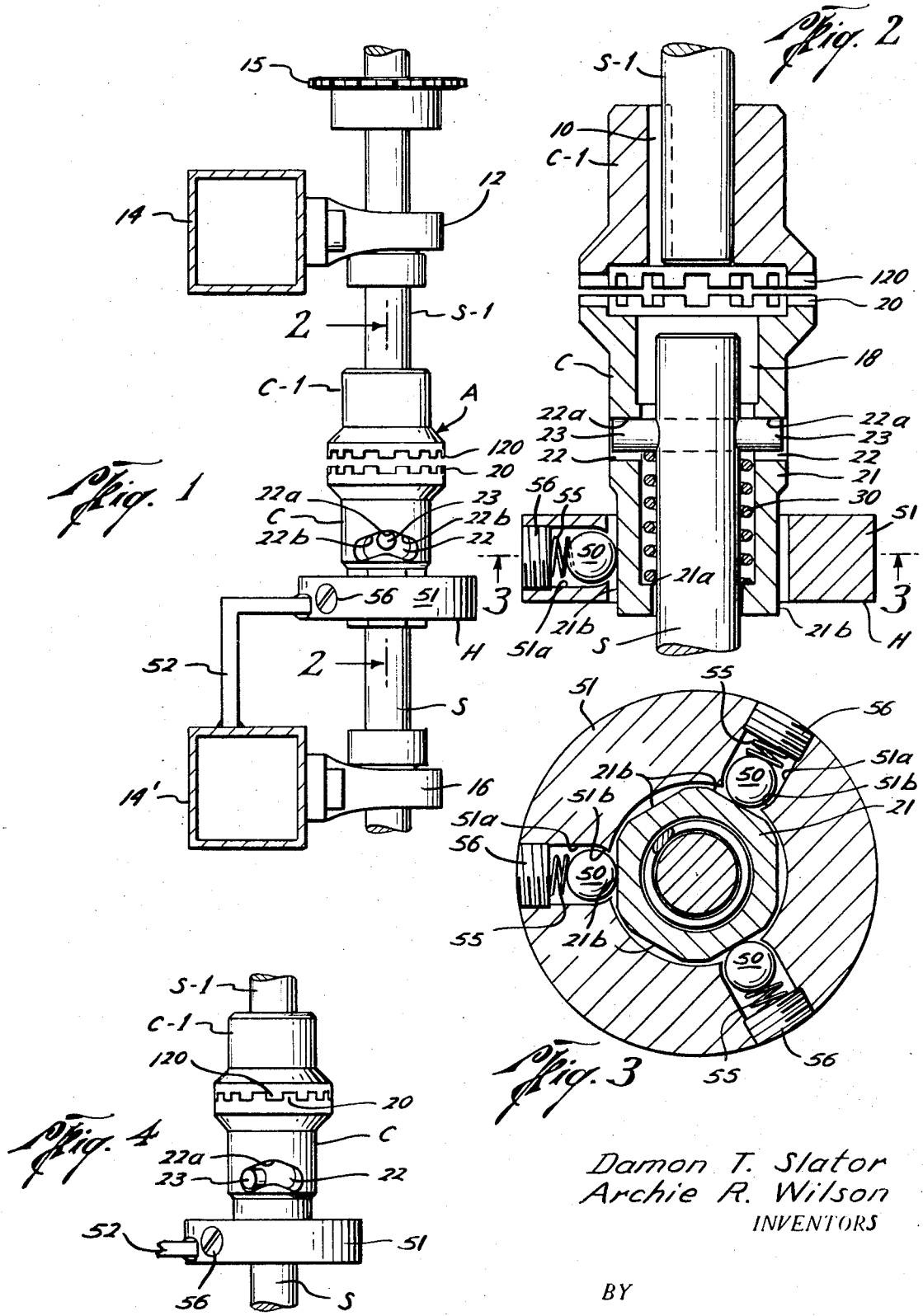

3,651,906

AUTOMATIC MECHANICAL CLUTCH

BACKGROUND OF THE INVENTION

The field of this invention is automatic mechanical clutches. Various types of mechanical and fluid clutches have been employed in the past for connecting and disconnecting two shafts. With fluid clutches, the rotation of one shaft acts through the fluid to automatically drive the other shaft. With mechanical clutches, however, one or more levers or external controls have been used to mechanically engage the clutch for thereby connecting two shafts or other working parts.

SUMMARY OF THE INVENTION

The clutch of the present invention automatically connects or disconnects two shafts upon the rotation or non-rotation, respectively, of one of the shafts, without requiring the manipulation of a lever or external control by an operator.

BRIEF DESCRIPTION OF THE DRAWING

FIG. 1 is an elevation of the clutch of this invention, partly in section, illustrating the clutch in a typical installation and in the disengaged position;

FIG. 2 is a vertical sectional view, partly in elevation, taken on line 2—2 of FIG. 1 to illustrate further details of the clutch of this invention;

FIG. 3 is a horizontal cross-sectional view taken on line 3—3 of FIG. 2; and

FIG. 4 is an elevation of the clutch of this invention in the engaged position.

DESCRIPTION OF THE PREFERRED EMBODIMENT

In the drawings, letter A designates generally the automatic mechanical clutch of this invention which has clutch elements C and C-1 which are connected with shafts S and S-1, respectively, in a manner to be hereinafter described. As will be explained in detail, upon a rotation of the shaft S a predetermined amount in either direction, the clutch elements C and C-1 are engaged so as to transmit further rotation of the shaft S through the clutch elements C and C-1 to the shaft S-1. Upon discontinuing the rotation of the shaft S, the clutch elements C and C-1 are automatically disengaged so that the shaft S-1 can thereafter be rotated independently of the shaft S.

Considering the invention more in detail, the shaft S-1 is connnected to the clutch elements C-1 by a suitable key 10 (FIG. 2), or any other suitable connecting means so that rotation of the shaft S-1 is transmitted to the clutch element C-1, and vice versa. The shaft S-1 may be suitably supported in any conventional bearing 12 which is mounted on a frame 14 or other suitable support. The shaft S-1 may be driven or rotated by any suitable source of power connected through a chain (not shown) to a sprocket 15 which is mounted on the shaft S-1. As will be explained hereinafter, the engagement of the clutch A can be effected at any relative rotational position of the clutch elements C and C-1, and once the clutch A is engaged, the shaft S-1 is then driven by the shaft S so as to overpower any driving force exerted on the shaft S-1 through the sprocket drive 15.

The shaft S is mounted in a suitable bearing 16 which is mounted on a frame 14' which may be a part of the same structure as the frame 14.

The shaft S extends upwardly into the interior bore 18 of the clutch element C, but it terminates short of the clutch teeth 20 on the clutch element C. It is to be noted that the clutch element C-1 has clutch teeth 120 which correspond with the clutch teeth 20 so that they can interfit with each other for engagement and for a locked driving connection between such elements C and C-1, as will be more fully explained in connection with FIG. 4.

The clutch element C has essentially a cylindrical body 21 which is formed with one, and preferably two, cam slots 22, each of which is adapted to receive a cam pin 23 which is suitably secured to the shaft S and is movable therewith. Each cam slot 22 is formed with an upper cam surface which has a mid-point 22a which is closer to the clutch teeth 20 than the rest of the cam surface of the slot 22. The legs or sides 22b of the cam surface of the slot 22 are inclined downwardly and away from the mid-point 22a so that when the cam pin 23 is moved rotationally relative to the cam slot 22, it rides on one of the cam surfaces 22b from the mid-point 22a to impart a longitudinal movement to the clutch element C relative to the shaft S. Such longitudinal movement of the clutch element C is sufficient to move the clutch element C from the disengaged position (FIGS. 1 and 2) to the engaged position (FIG. 4).

A coil spring 30, or other suitable resilient means is confined between the cam pin 23 and a retaining shoulder 21a in the body 21 of the clutch element C. Such spring 30 is preferably positioned under slight compression at all times so that it acts to urge the pin 23 and the shaft S therewith in a longitudinal direction relative to the clutch element C towards the clutch teeth 20. Such urging maintains the upper surface of the pin 23 in engagement with the upper cam surface of the cam slot 22 as viewed in FIGS. 1 and 2, at all times. When the pin 23 moves from the mid-point 22a to the extremity on either side of the slot 22, the clutch element C is moved upwardly relative to the shaft S as viewed in FIGS. 1 and 2 and such movement causes an increase in the compression of the spring 30 since it is confined between the pin 23 and the shoulder 21a.

A holding means H is provided for coaction with the clutch element C to prevent the element C from rotating until the cam pin 23 has reached its extremity at either end of the cam slot 22, at which time the holding means H is releasable for enabling the clutch element C to move with the shaft S as it is rotated. The holding means H is preferably made with one or more engaging members or balls 50 which are disposed in radial openings 51a in a ring 51.

The ring 51 is fixed to a frame such as the frame member 14' through a connector 52 (FIG. 1) so that the ring 51 does not rotate. Although the number of holes or slots 51a in the ring 51 may vary, it is preferable to provide three of such slots for receiving three holding balls 50. Each of the balls 50 is urged radially inwardly towards the clutch element body 21 by a coil spring 55, or other suitable resilient means. Each spring 55 is releasably confined under compression against one of the balls 50 by a retaining screw 56 which is suitably threaded into the ring 51. The inner end of each slot 51a is preferably curved as indicated at 51b so as to limit the extent of inward movement of each ball 50 so that the balls 50 are not forced out of the openings 51a due to the spring pressure of the springs 55 thereon.

The external lower surface of the clutch element C is formed with a plurality of flat surfaces 21b, which are preferably six in number, and which surfaces 21b are adapted to be engaged by one of the balls 50 for exerting a holding force on the clutch element C. However, when a sufficient rotational force is exerted on the clutch element C by the shaft S when the pin or pins 23 reach the extremity of the cam slot or slots 22 in one direction, the balls 50 are forced outwardly against the springs 55 so as to permit the clutch element C to rotate with the shaft S.

In the operation of the clutch A of this invention, the shaft S-1 is free-wheeling, i.e., it is free to rotate or be rotated independently of the shaft S when the clutch A is disengaged. However, when it is desirable to drive the shaft S-1 so as to control its rotation, it is accomplished by rotating the shaft S either manually or mechanically in either direction, depending upon the direction of rotation desired for the shaft S-1. The clutch A is automatically engaged after a predetermined amount of rotation of the shaft S, and it is automatically disengaged upon a discontinuing of the rotation of the shaft S.

Thus, the spring 30 holds the cam pin 23 in the upper position shown in FIGS. 1 and 2 so as to normally hold the clutch teeth 20 and 120 apart from each other, whereby the clutch elements C and C-1 are disengaged from each other. Such condition exists so long as the pin 23 remains at substantially the mid-portion or point 22a of the slot or slots 22. Such location of the pin 23 remains at the mid-point 22a so long as the shaft S is stationary with respect to the clutch element C. While the shaft S is stationary and the clutch teeth 20 and 120 are disengaged from each other, the shaft S-1 is free to rotate independently of the shaft S, and it may be rotated through any suitable means such as by engagement with the drive sprocket 15.

Upon a rotation of the shaft S in one rotational direction, the clutch element C is held initially to prevent its rotation with the shaft S. The holding is accomplished through the holding means H due to the spring pressed balls 50 which are in engagement with the plurality of flat surfaces 21b of the clutch element C. Because the clutch element C is thus held initially against rotation, the cam pin or pins 23 move relative to the clutch element C along the cam surfaces provided at the upper end of the cam slots 22. Since the shaft S is mounted on the fixed frame 14' or other suitable support or frame, the movement of the shaft S causes a camming or longitudinal movement of the clutch element C longitudinally upwardly as viewed in FIGS. 1 and 2 which is in a direction to cause the teeth 20 and 120 to engage with each other. Should the teeth 20 and 120 be so misaligned that the teeth on one of the clutch elements cannot interfit with the teeth on the other of the clutch elements, the teeth 20 and 120 will contact each other enough so that a driving force is exerted from the cam pin or pins 23 to the clutch element C to overcome the pressure of the balls 50 and to thus rotate the clutch element C with the shaft S. Such rotation occurs for only a relatively short distance before the teeth 20 and 120 are aligned so that they can interfit with each other, at which time, the cam pin 23 may go all of the way to the end of its cam slot 22, thus forcing the clutch element C to the fully engaged position shown in FIG. 4.

Of course, if the teeth 20 and 120 are aligned at the time the shaft S is initially rotated, the pin 23 will move to one end of the slot 22 prior to any rotation of the clutch element C, so that the clutch teeth 20 and 120 become interengaged and locked with each other before rotation of the clutch element C occurs.

After the clutch teeth 20 and 120 have become connected, the continued rotation of the shaft S in the same direction is transmitted through the cam pin 23 to the clutch element C and thus to the clutch element C-1 so as to transmit the rotation of the shaft S to the shaft S-1.

When the shaft S is stopped, the spring 30 acts to return the clutch element C downwardly by causing the cam surface 22b to ride along the cam pin 23 until the cam pin 23 has reached the mid-point 22a, at which time the teeth 20 and 120 are fully disengaged (FIG. 1).

It is to be noted that the cam 22 is provided with two oppositely inclined cam surfaces 22b which diverge downwardly from the mid-point 22a so as to accomplish an engagement of the clutch elements C and C-1 upon a rotation of the shaft S in either direction. It will be appreciated that only one-half of each cam slot 22 may be utilized, in which case, the clutch A would be engaged in only one rotational direction of the shaft S.

The foregoing disclosure and description of the invention are illustrative and explanatory thereof, and various changes in the size, shape, and materials as well as in the details of the illustrated construction may be made without departing from the spirit of the invention.

In the claims:

1. An automatic mechanical clutch adapted to connect and disconnect two shafts, comprising:
    a first clutch element fixed on a first shaft for rotation together;
    a second clutch element mounted on a second shaft for limited rotational movement relative to each other;
    means for urging said clutch elements apart to a disengaged position when said second shaft is substantially stationary with respect to said second clutch element;
    actuating means for moving said second clutch element into operable engagement with said first clutch in response to a predetermined amount of rotation of said second shaft relative to said second clutch element and for thereafter transmitting rotation of said second shaft through said engaged clutch elements to said first shaft; and
    releasable holding means for releasably holding said second clutch element against rotation until a predetermined torque is applied thereto from said shaft.

2. The structure set forth in claim 1, wherein said means for urging said clutch elements apart acts to return said clutch elements to the disengaged position when the rotation of said second shaft is discontinued.

3. The structure set forth in claim 1, wherein said means for urging said clutch elements apart includes:
    a spring; and
    means on said clutch element and said second shaft for confining said spring and compressing it upon a rotation of said second shaft relative to said second clutch element.

4. The structure set forth in claim 1, wherein said holding means includes:
    a plurality of flat surfaces on the external surface of said second clutch element; and
    a spring pressed ball resiliently engaging one of said flat surfaces.

5. The structure set forth in claim 1, wherein said actuating means includes:
    a cam guide surface formed in said second clutch element; and
    a cam pin on said second shaft extending into engagement with said cam guide surface for following same to effect a longitudinal movement of said second clutch element relative to said second shaft an said first clutch element.

6. The structure set forth in claim 5, wherein:
    said cam guide surface extends laterally and is formed with two legs which are inclined towards each other to a midpoint which is displaced longitudinally closer to said first clutch element than the rest of said cam guide surface.

7. The structure set forth in claim 1, wherein:
    said clutch elements have clutch teeth which interfit to lock said clutch elements together when they are moved into interfitting engagement.

* * * * *